(No Model.)

J. CAMERON & C. H. ALLEN.
SAW TOOTH.

No. 365,363. Patented June 28, 1887.

Attest:
John Schuman.

Inventors:
Joseph Cameron,
and
Charles H. Allen.
By Att'y
Tho. S. Sprague

UNITED STATES PATENT OFFICE.

JOSEPH CAMERON AND CHARLES H. ALLEN, OF EAST SAGINAW, MICHIGAN.

SAW-TOOTH.

SPECIFICATION forming part of Letters Patent No. 365,363, dated June 28, 1887.

Application filed October 28, 1886. Serial No. 217,420. (No model.)

*To all whom it may concern:*

Be it known that we, JOSEPH CAMERON and CHARLES H. ALLEN, of East Saginaw, in the county of Saginaw and State of Michigan, have invented new and useful Improvements in Saw-Teeth; and we hereby declare that the following is a full, clear, and exact description thereof, reference being had to the accompanying drawings, which form a part of this specification.

This invention relates to new and useful improvements in detachable saw-teeth; and the invention consists in the combination of a peculiarly-formed saw-tooth and its locking device, all as hereinafter described and claimed.

Figure 1:
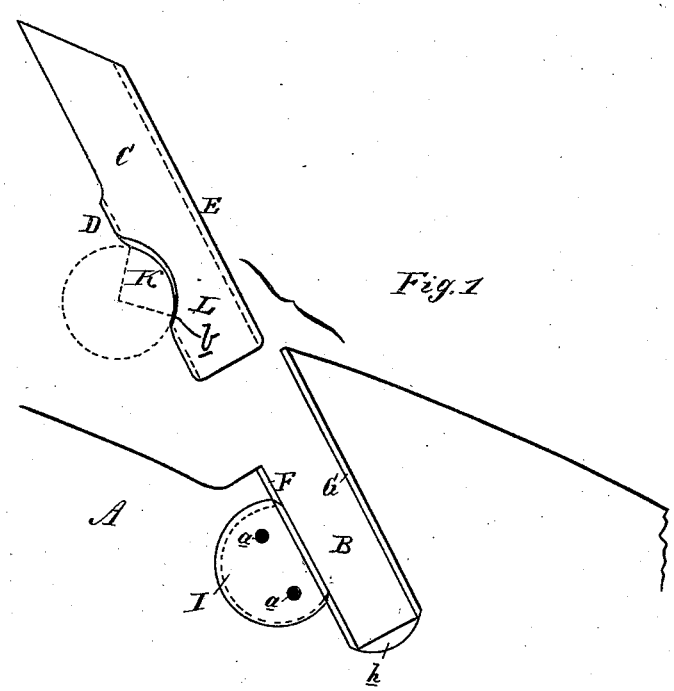
Figure 2:
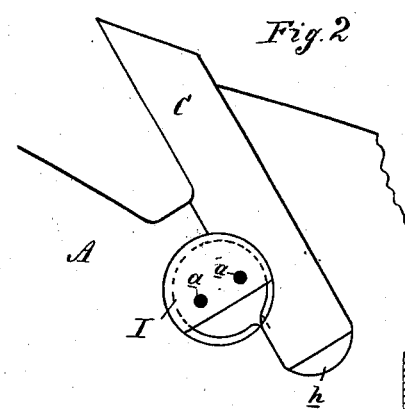
Figure 3:
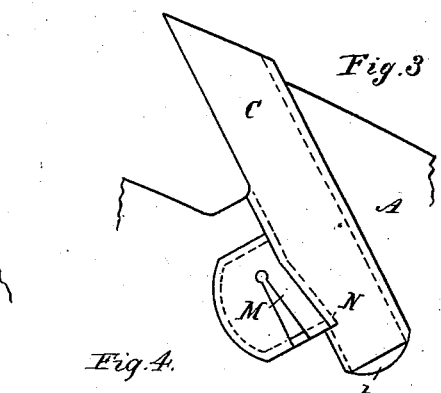
Figure 4:
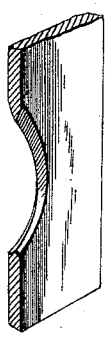

In the accompanying drawings, which form a part of this specification, Figure 1 is a side elevation of a portion of a saw-blade, showing a toothed socket and locking device, the saw-tooth being withdrawn and shown detached. Fig. 2 is a similar side elevation with the saw-tooth engaged and locked in position with the saw-blade. Fig. 3 is a modification of my invention in regard to the locking device for holding the tooth. Fig. 4 is a sectional perspective of the tooth on a larger scale.

A is a saw-blade. B is a socket formed therein to receive the detachable tooth C. This tooth is straight, and has two parallel sides, D E, which are provided with V-shaped grooves, by means of which it engages with the correspondingly-shaped edges F G of the socket in the saw-blade, a sliding movement in a straight line being required to engage or disengage the saw-tooth from the socket in the saw-blade, the latter being provided with a rounding bottom, *h*, which permits the application of a suitable tool to start the tooth from its socket, if necessary.

The locking device consists of a segmental circular plate, I, rotatably secured in a correspondingly-shaped socket upon the front side of the saw-tooth. This locking-plate has a V-shaped groove around its edge, which engages with a correspondingly-shaped edge of the socket, all so arranged that when said locking-plate is turned into the position shown in Fig. 1 its straight side registers with the front side of the socket of the saw-tooth. The saw-tooth is cut away upon the side toward the locking-plate in such manner that when the tooth is inserted such cut-away portion K permits the partial rotation of the locking-plate, as shown in Fig. 2, a further rotation being prevented by a wedge-shaped action brought about by forming the lower part, L, of the cut-away portion K on the saw-tooth slightly eccentric and gradually less V-shaped than would be required for the free rotation of the locking-plate, as shown at *b* in Fig. 1. The locking-plate is also provided with holes *a*, or equivalent devices, to permit of its being turned forcibly by means of a suitable wrench, and thereby made to securely wedge the tooth in position.

The locking-plate is preferably made a little larger than one-half of a circle. This prevents it from falling out.

In practice the locking-plate exerts a great pressure against the front of the tooth, and thereby in pressing the latter against the back of the socket in the saw-blade holds the latter with a firm grip.

In the modification shown in Fig. 3, the locking-plate is arranged to be withdrawn laterally from its socket, and its locking action is produced by the formation of a tang, M, which acts in connection with a notch, N, in the tooth, all so arranged that the tooth after being inserted is prevented from withdrawal by the engagement of the tang M into the notch N, as shown.

What we claim as our invention is—

In a detachable saw-tooth, the combination of the saw-blade having the rotatable segmental locking-disk I, provided with a V-shaped groove upon its edge, and the saw-tooth C, having the cut-away portion K, said portion K being V-shaped on the edge and made less V-shaped toward the lower end, all arranged substantially as described.

JOSEPH CAMERON.
CHAS. H. ALLEN.

Witnesses:
THOS. G. DERRY,
GEO. GREEN.